Nov. 18, 1930. V. T. COMER 1,781,914
ELECTRIC CELL TESTING MACHINE
Filed Feb. 26, 1927 2 Sheets-Sheet 1
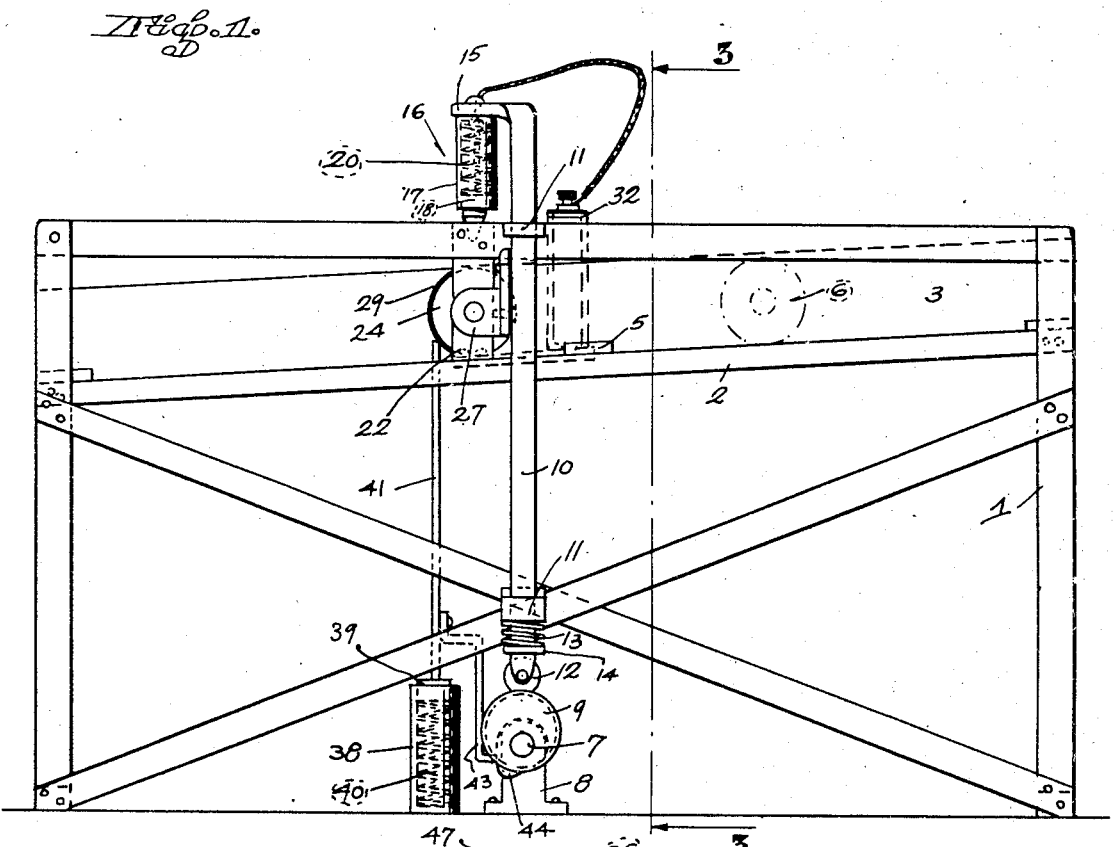
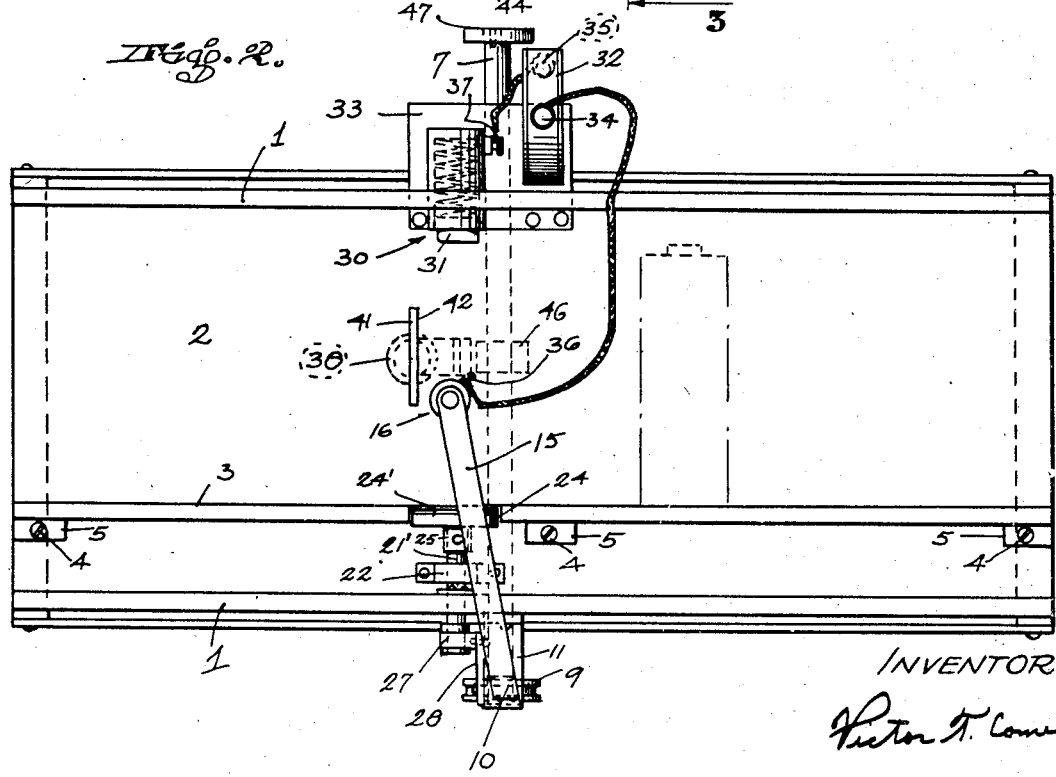
INVENTOR Nov. 18, 1930.   V. T. COMER   1,781,914
ELECTRIC CELL TESTING MACHINE
Filed Feb. 26, 1927   2 Sheets-Sheet 2
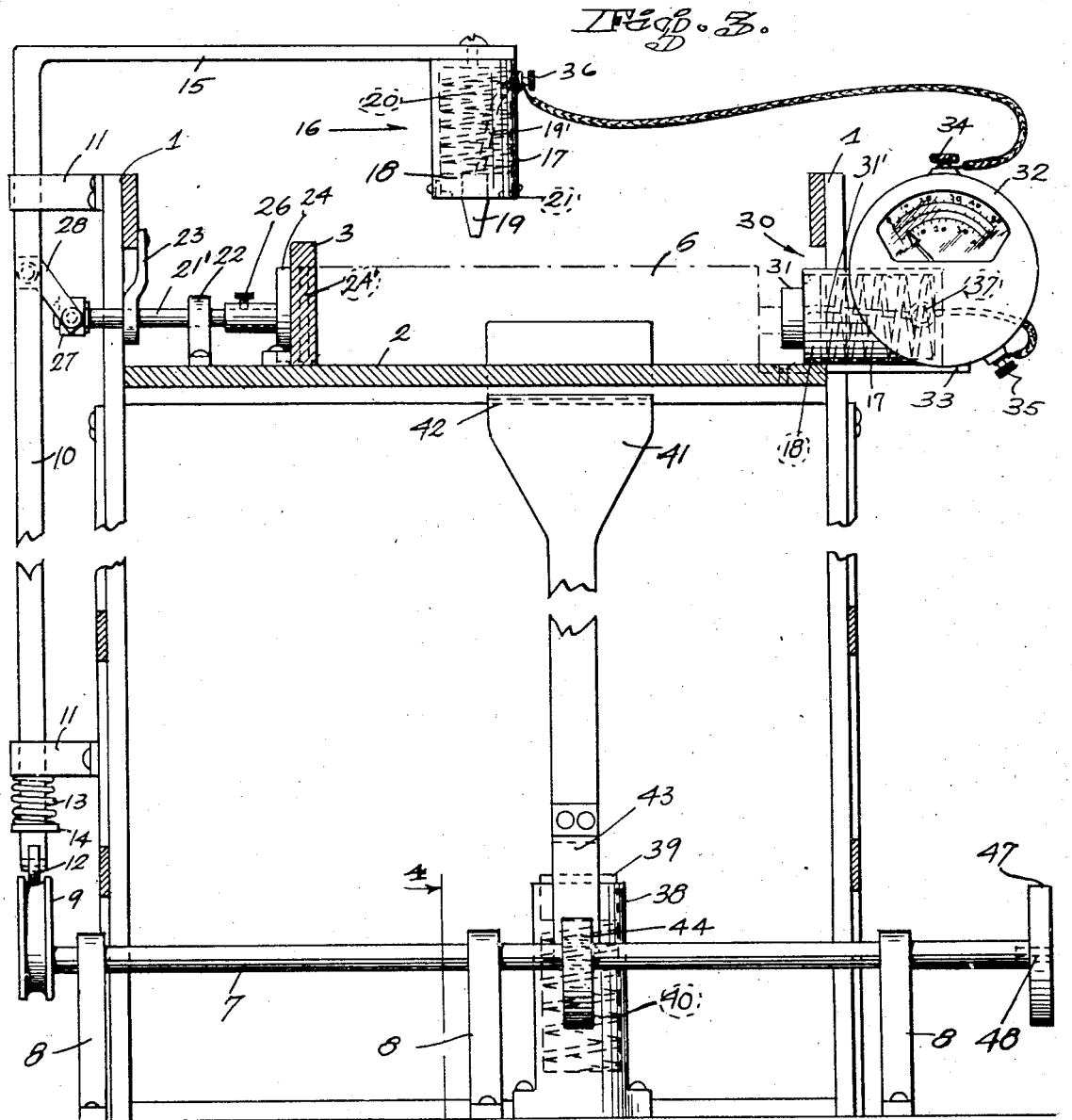
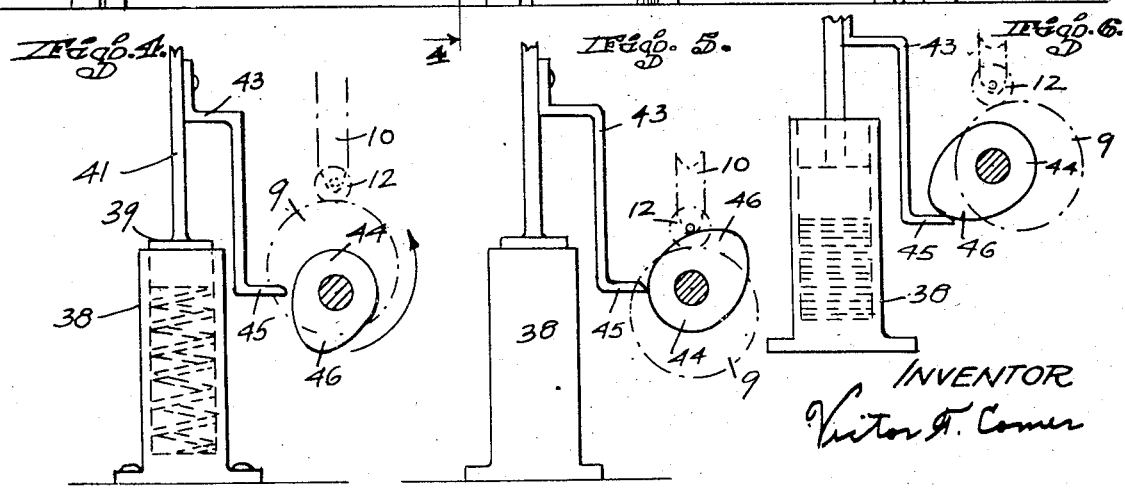
INVENTOR
Victor T. Comer Patented Nov. 18, 1930

1,781,914

UNITED STATES PATENT OFFICE

VICTOR T. COMER, OF SAN FRANCISCO, CALIFORNIA

ELECTRIC-CELL-TESTING MACHINE

Application filed February 26, 1927. Serial No. 171,346.

This invention relates particularly to machines for testing the electric charge of a standard electric cell or battery.

An object of the invention is to provide a machine for automatically and accurately testing the cells thereby to provide means for a speedier selection of the cells of different electrical charges.

A further object of the invention is to provide a machine which automatically clamps a cell in the testing position and simultaneously completes the electrical connections with an instrument to indicate the electrical charge of the cell.

A still further object of this invention is to provide a machine which can be readily synchronized with the speed of the production of the cell finishing or cell charging device.

Another object of this invention is to provide a testing machine which is readily adaptable to test cells of different sizes.

Other objects of the invention are to provide a device of the character described that will be superior in point of simplicity, inexpensiveness of construction, positiveness of operation, and facility and convenience in use and general efficiency.

In this specification, and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying two sheets of drawings

Fig. 1 is a side elevation of the machine
Fig. 2 is a plan view of Fig. 1
Fig. 3 is a cross section taken on Fig. 1 line 3—3, drawn to a larger scale.
Fig. 4 is a fragmentary section taken on Fig. 3 line 4—4, showing the relative position of the driving mechanism in the open position of the clamping means.
Fig. 5 is the same as Fig. 4, showing the relative position of the clamping means.
Fig. 6 is the same as Fig. 4 showing the relative position of the driving mechanism just before the cell is released from the clamping means.

In detail the construction illustrated in the drawings comprises a frame 1. An inclined guide 2 is fixedly secured to the frame 1. The upstanding guide member 3 is removably secured to the floor member of the guide 2 by means of screws 4. Said screws 4 extend through the lugs 5 into the floor member 2.

An electrically charged cell 6 is shown in broken lines in Fig. 1-2, and 3. The cell 6 is moved by gravity on the guide 2, but it may be carried by any conventional means such as an endless conveyer. A shaft 7 is supported in bearing brackets 8 and extends across under the guide 2. An eccentric 9 having a groove on its periphery is carried on one end of the shaft 7. A vertically disposed rod 10 is guided in brackets 11 on the frame 1, and is supported on the periphery of the eccentric 9. A roller 12 is rotatably secured in the end of the rod 10 in order to reduce the friction between the rod 10 and the eccentric 9. An expansion spring 13 exerts a pressure on a collar 14 of the rod 10, the other end of the spring 13 presses against the guiding bracket 11 thereby forces the rod 10 towards the eccentric 9. The rotation of the shaft 7 and the eccentric 9 reciprocates the rod 10 in the guiding brackets 11.

A horizontally projecting portion 15 of the rod 10 extends over the guide 2 and is spaced therefrom. A contacting device 16 is mounted on the projection 15 and is comprised of a cylinder 17 closed at the end adjacent to the projection 15. An insulating disc 18 is slidably mounted in the cylinder 17. A contact point 19 is secured in the insulating disc 18. An insulated wire connection 19' connects the contact point 19 to the terminal 36. The terminal is insulated from the cylinder 17. An expansion spring 20 housed in the cylinder 17 exerts a downward pressure on the disc 18. Lugs 21 are secured to the cylinder 17 and extended to under the disc 18 thereby preventing the disc 18 from falling out of the cylinder 17. The reciprocating motion of the rod 10 moves the contacting device 16 upwardly and downwardly for the purpose to be hereinafter described.

A shaft 21' is slidably supported in bearing 22 and 23 on the frame 1. A clamping disc 24 having an insulating disc 24' thereon carries a hollow collar 25. Shaft 21' telescopes into the hollow collar 25 and is secured therein by a set screw 26 in any selected position, thereby permitting the adjustment of the effective length of the shaft 21'. A collar 27 is secured to the end of the shaft 21'. A lever 28 is pivotally secured at one end to the collar 27 on the other end to rod 10.

The movement of the rod 10 reciprocates the clamping disc 24 across an aperture 29 in guide member 3 by means of the toggle action of the lever 28 and shaft 21.

A stationary contacting device 30 is secured to the guide 2. The device 30 is in alignment with the disc 24 and is disposed opposite thereof. The stationary contacting device 30 has a similar structure to that of the contacting device 16 heretofore described. The contact point 31 is disc shaped. It is secured to the insulating disc 18 and is connected by an insulated wire 31 to the terminal 37, said terminal 37 also being insulated from the cylinder 17. The action of the spring 20 in the cylinder 17 renders the contact resilient.

An electrical measuring instrument 32 is mounted on a plate 33, which in turn is fastened to the guide 2. The terminals 34 and 35 of the instrument 32 are connected to the respective terminals 36 and 37 of the contactors by conventional flexible and insulated wires.

The movement of the cells on the guide is blocked opposite the disc 24 by a mechanism comprising a cylinder 38 having a disc 39 slidably mounted therein. An expansion spring 40 is disposed in the cylinder 38 and supports the disc 39 in its elevated position. A plate 41, made of insulating material, is secured to the disc. The free end of the plate 41 is guided in a slot 42 of the guide 2 and extends above the level of the guide. A lever 43 is fixedly secured to the plate 41. A cam 44 is keyed to the shaft 7, opposite the lever 43. A bent portion 45 of the lever 43 extends horizontally towards the cam 44 far enough to be engaged by the protruding part 46 of the cam 45. The cam 44 rotated in contra clockwise direction engages the bent portion 45 of the lever 43, thereby moving the plate 41 downwardly against the action of the expansion spring 40. The relation between the cam 44 and the lever 43 is such that the revolution of the cam 44 lowers the free end of the plate 41 slightly below the top level of the guide 2 at a predetermined time. The cam 44 is placed on the shaft 7 in such relation to the eccentric 9 that it engages the lever 43 when the eccentric 9 is raising the rod 10. After the eccentric portion 46 of the cam 44 released the extension 45, the spring 40 returns the plate 41, to its elevated position as indicated in Fig. 3.

A pulley 47 is secured to the end of the shaft 7 to be engaged by any conventional driving means not shown. A rectangular hole 48 in the end of the shaft 7 permits the use of a handle thereby allowing the manual operation of the machine.

This invention operates as follows: The testing machine is disposed at the discharge end of a cell or battery finishing machine or it may be interposed between endless conveyers. The operation of the machine is synchronized with the speed of a finishing machine by a properly adjusted driving mechanism, not shown, to be connected to the pulley 47.

The cell 6 rolls on the inclined guide. The center terminal of the cell 6 is directed towards the side of the frame adjacent to the contacting device 30. The movement of the cell 6 is stopped between the disc 24 and contacting device 30 by the plate 41. At this point of the operation the cam 44 and lever 43 are in the relative position shown in Fig. 4. The lever 43 is in elevated position. The relative position of the eccentric 9 and the elevated rod 10 is shown in broken lines.

After the shaft 7 is rotated about 180 degrees in contra clockwise direction as in Fig. 5 the lever 43 is still in elevated position, while the rod 10 is completely lowered by the action of the eccentric 9. The lowering of the rod 10 straightens out the toggle formed by the lever 28 and shaft 21. The toggle action advances the disc 24 in the direction of the device 30 thereby pressing the cell 6 against the resiliently mounted contact point 31 and thereby connecting the terminal of the cell through said contact point 31 to the terminal 35 of the instrument 32.

Simultaneously the lowered rod 10 presses the resiliently mounted contact point 19 against the shell of the cell 6. The shell of the cell 6 functions as the other terminal of the cell and is connected by point 19 through the terminal 36 to the terminal 34 of the instrument 32. Thus the electric circuit is completed, from one terminal of the battery, through the connecting device 30 to the terminal 35, through the instrument 32, terminal 34 and the contacting device 16 to the shell of the cell 6. The instrument registers the electrical charge of this circuit. As an illustration the drawing shows a volt meter. A flashlight dry cell normally registers 1.5, to 1.7 volt on the volt meter, but the machine can be used to test dry cells of any voltage required.

Fig. 6 shows the relative position of the cam and the eccentric at about 110 degrees past the position shown in Fig. 5. In this position the clamp is opened and the terminals of the cell are disconnected. Lever 43 is engaged by the eccentric portion 46 of the cam 44 and moved downwardly thereby lowering the plate 41. Thus cell 6 is permitted to roll off the guide 2.

Further rotation of the shaft 7 releases the plate 41. The cam 44 and eccentric 9 are returned to the position indicated in Fig. 4 and the machine is ready to receive the next cell 6.

Having thus described this invention, what I now claim and desire to secure by Letters Patent is:

1. In combination an electric cell, an inclined guide, an electrical measuring instrument related to the guide, a resiliently supported plate extending above the guide to block the movement of the cell, means to lower the plate below the level of the guide, means to momentarily clamp the cell and to electrically connect the said cell and said instrument, and means to engage and disengage the clamping means.

2. In combination an electric cell, an inclined guide, an electrical measuring instrument related to the guide, means to block the movement of the cell, means to momentarily clamp the cell said clamping means comprising a stationary contactor, to be supported on the guide, a clamping disc slidably disposed on the guide opposite said contactor, a movable contactor operatively connected to said disc, means to reciprocate said disc and the movable contactor and to reciprocate said blocking means; and means to electrically connect said contactors to said instrument.

3. In combination an electric cell, an inclined guide, an electrical measuring instrument related to the guide, means to block the movement of the cell, means to momentarily clamp the cell, said clamping means comprising a stationary contactor to be mounted on the guide adjacent to said blocking means, and to be electrically connected to the instrument, a disc slidably mounted on the guide opposite said stationary contactor, a toggle mechanism to reciprocate said disc, a rod to be slidably supported on the guide and to be operatively connected to said toggle mechanism, a contactor to be secured to the rod and to be disposed above the clamping means and to be electrically connected to the instrument, and means to reciprocate said rod and said blocking means.

4. In combination an electric cell, an inclined guide, an electrical measuring instrument related to the guide, means to block the movement of the cell, means to momentarily clamp the cell, said clamping means comprising a stationary contactor to be mounted on the guide adjacent to said blocking means and to be electrically connected to the instrument, a disc slidably mounted on the guide opposite said stationary contactor, a toggle mechanism to reciprocate said disc, a rod to be slidably supported on the guide and to operatively connected to said toggle mechanism, a contactor to be secured to the rod and to be disposed above the clamping means and to be electrically connected to the instrument, means to reciprocate said rod and said blocking means, said reciprocating means comprising a shaft related to the guide, cams on the shaft operatively connected to the rod and to said blocking means.

5. An electric cell testing machine comprising a guide, an electrical measuring instrument related to the guide, contacting means related to the guide to momentarily clamp the cell on the guide and to complete an electric circuit through the cell and the instrument, and reciprocating means movable into and out of the path of the cell movement on the guide to momentarily interrupt the movement of the cell at said contacting means.

6. An electric cell testing machine comprising a guide on which the cell moves, an electrical measuring instrument related to the guide, reciprocating means to momentarily interrupt the movement of the cell on the guide, and means on the guide adjacent to the point of interruption to automatically clamp the cell thereat for a period, and to electrically connect the same into the electric circuit of the instrument.

7. An electric cell testing machine comprising a guide, an electrical measuring instrument related to the guide, said guide being adapted to allow continuous gravity movement of the cells thereon, reciprocating means related to the guide to momentarily interrupt the gravity movement of the cell on said guide, and means connected to said instrument and actuated in synchronism with said reciprocating means to complete an electric circuit through said cell and said instrument, when the cell movement is interrupted.

8. An electric cell testing machine comprising a guide, an electric measuring instrument related to the guide, contacting means related to the guide to momentarily clamp the cell on the guide and to complete an electric circuit through the cell and the instrument, and means movable into and out of the path of the cell movement on the guide to momentarily interrupt the movement of the cell at said contacting means, said contacting means comprising, a contact on one side of the path of the cell movement adapted to be engaged with the end of the cell, a second contact, and holding means for said second contact adapted to move the same into engagement with the side of the cell, said first and second contacts being connected into the electric circuit of the instrument to close the circuit through the cell when engaged therewith.

9. An electric cell testing machine comprising a guide, an electric measuring instrument related to the guide, contacting means related to the guide to momentarily clamp the cell on the guide and to complete an electric circuit through the cell and the instrument, and means movable into and out of the path of the cell movement on the guide to momentarily interrupt the movement of the cell at said contacting means, said contacting means comprising a contact on one side of the path of the cell movement adapted to be engaged with the end of the cell, a second contact, means to hold the second contact and to move the same into engagement with the side of the cell, said first and second contacts being connected into the electric circuit of the instrument so as to close the circuit through the cell when engaged therewith, and means to move said contacts and said interrupting means in synchronism with each other.

In testimony whereof, I have hereunto set my hand at San Francisco, California, this 21st day of February, 1927.

VICTOR T. COMER.